United States Patent
Zhenming et al.

(10) Patent No.: US 12,318,975 B2
(45) Date of Patent: Jun. 3, 2025

(54) MOLDING METHOD OF RESIN MOLDED PRODUCT

(71) Applicant: Alps Alpine Co., Ltd., Tokyo (JP)

(72) Inventors: Liu Zhenming, Dalian (CN); Ye Nan, Dalian (CN)

(73) Assignee: ALPS ALPINE CO., LTD., Tokyo (JP)

(*) Notice: Subject to any disclaimer, the term of this patent is extended or adjusted under 35 U.S.C. 154(b) by 74 days.

(21) Appl. No.: 18/329,089

(22) Filed: Jun. 5, 2023

(65) Prior Publication Data

US 2023/0405890 A1   Dec. 21, 2023

(30) Foreign Application Priority Data

Jun. 20, 2022  (CN) .......................... 202210701253.6

(51) Int. Cl.
*B29C 45/14* (2006.01)
*B29C 45/16* (2006.01)

(52) U.S. Cl.
CPC .... *B29C 45/14065* (2013.01); *B29C 45/1615* (2013.01); *B29C 2045/14131* (2013.01)

(58) Field of Classification Search
CPC ........ B29C 45/14065; B29C 45/14131; B29C 2045/14131
See application file for complete search history.

(56) References Cited

U.S. PATENT DOCUMENTS

| | | | |
|---|---|---|---|
| 2005/0127565 A1* | 6/2005 | Wilson | B29C 45/1418 425/129.1 |
| 2009/0117398 A1* | 5/2009 | Helmstetter | B29C 45/0081 205/164 |
| 2020/0408295 A1* | 12/2020 | Iijima | B29C 45/14065 |

FOREIGN PATENT DOCUMENTS

| | | |
|---|---|---|
| JP | 2005-238509 A | 9/2005 |
| JP | 2018-069503 A | 5/2018 |

* cited by examiner

*Primary Examiner* — Edmund H Lee
(74) *Attorney, Agent, or Firm* — Crowell & Moring LLP

(57) ABSTRACT

A method of molding a resin molded product, including: a first molding step of injecting a first resin molding material into a first molding die to form a first resin product, wherein a fixing protrusion is formed on at least one of an inner and an outer wall part of the first resin product, and has a shape in which a width increases in a direction extending from the gap; and, a second molding step of positioning the first resin product in a second molding die, and injecting a second resin molding material at least into the gap of the first resin product to form a second resin product, wherein the fixing protrusion is embedded into a fixing recess disposed on the second molding die, thereby limiting movement of the fixing protrusion in a direction towards the gap.

6 Claims, 5 Drawing Sheets

MOLDING METHOD OF RESIN MOLDED PRODUCT

RELATED APPLICATION

The present application claims priority to Chinese Patent Application No. 202210701253.6, filed on Jun. 20, 2022, the entirety of which is hereby incorporated by reference.

BACKGROUND

1. Field

The present disclosure relates to a resin molded product and a molding method thereof, which can prevent the appearance of the resin molded product from being affected by deformation in a molding process of the resin molded product.

2. Description of the Related Art

Double-shot molding refers to a molding technology in which two different materials are injected into the same die so that injection-molded parts are formed by two materials. The two materials can be of different colors or different hardness.

A cylindrical structure for mounting a rotary button is shown in FIG. 6A and FIG. 6B. FIG. 6A shows a molded product having: a cylindrical inner wall part 1 into which a button is inserted, wherein at a cylindrical outer edge of the inner wall part 1, an annular thin plate-like outer wall part 2 is connected by two opposing connecting parts 3, and a gap 4 is formed by a space between the inner wall part 1 and the outer wall part 2. Following molding of the product shown in FIG. 6A, a die is changed for secondary molding. As shown in FIG. 6B, a transparent resin molding material is injected into the gap 4 and is integrally molded with the molded product to form a secondary molded product. A transparent structure formed in the gap 4 can be used for light guiding and lighting to form an aperture around the rotary button, so that a user can use the rotary button conveniently in dark conditions, and the aesthetics of the product are improved.

However, during the secondary molding process, when a high-temperature resin molding material is injected into the gap 4, the thin plate-like outer wall part 2 is prone to deformation by thermal shock, especially portions that are not connected and supported by the connecting parts 3, and shrinks toward a side close to the gap 4 subjected to the thermal shock during cooling, resulting in inconsistency of the spacing of the gap 4, as shown in FIG. 6B. After the secondary molded product is formed, the display of the aperture is uneven when the gap 4 is illuminated, so that the appearance of the product and the illuminating effect are negatively affected. In addition, after the secondary molded product is mounted on an article of manufacture, the shrunk outer wall part 2 is partially far away from the side of the gap 4, which will also negatively affect the external aesthetics due to the missing portion; and, the missing portion may also cause the ingress of dust or liquid, negatively affecting the normal use and life of internal electronic elements.

SUMMARY

It is an object of the present disclosure to provide a resin molded product and a molding method of the resin molded product, which can prevent the resin molded product from deforming during a molding process.

The molding method of the resin molded product of the present disclosure includes: a first molding step of injecting a first resin molding material into a first molding die to form a first resin product, the first resin product having an inner wall part, an outer wall part spaced from the inner wall part by a gap, and a connecting part which is disposed in the gap and partially connects the inner wall part and the outer wall part; and, a second molding step of disposing the first resin product in a second molding die, and injecting a second resin molding material at least into the gap of the first resin product to form a second resin product, wherein in the first molding step, a fixing protrusion is formed on any one of the inner wall part and the outer wall part of the first resin product and has a shape in which a width increases from the gap to a distal side; and in the second molding step, the fixing protrusion is embedded into a fixing recess disposed on the second molding die, thereby limiting movement of the fixing protrusion in a direction towards the gap, and the second resin molding material is injected into the gap of the first resin product.

According to the molding method of the resin molded product, when the second resin molding material is injected after the fixing protrusion is embedded into the fixing recess, the fixing protrusion does not move in the direction towards the gap between the inner wall part and the outer wall part. In this way, a relative positional relationship between the inner wall part and the outer wall part would not be changed even if the inner wall part or the outer wall part provided with the fixing protrusion is subjected to thermal shock or cooling shrinkage.

Furthermore, in the molding method of the resin molded product, the fixing protrusion, in an inner-outer direction, is not disposed at a position opposite to the connecting part.

Furthermore, in the molding method of the resin molded product, when a plurality of the connecting parts are disposed in a mutually spaced manner in a direction along the gap, the fixing protrusion is disposed at a middle position of an adjacent pair of the connecting parts.

Furthermore, in the molding method of the resin molded product, when any one of the inner wall part and the outer wall part is a thin plate-like structure, the fixing protrusion is disposed on the inner wall part or the outer wall part of the thin plate-like structure.

Furthermore, in the molding method of the resin molded product, a width of the fixing protrusion gradually increases as the fixing protrusion gets away from the gap.

In addition, the present disclosure also provides a resin molded product, including: a first resin product having an inner wall part, an outer wall part disposed to be spaced from the inner wall part by a gap, and a connecting part which is disposed in the gap and partially connects the inner wall part and the outer wall part; and a second resin product formed by filling in the gap of the first resin product, wherein a fixing protrusion is integrally formed on any one of the inner wall part and the outer wall part of the first resin product, and the fixing protrusion has a shape in which a width increases from the gap to a distal side.

Furthermore, in the resin molded product, the fixing protrusion, in an inner-outer direction, is not disposed at a position opposite to the connecting part.

Furthermore, in the resin molded product, when a plurality of the connecting parts are disposed in a mutually spaced manner in a direction along the gap, the fixing protrusion is disposed at a middle position of an adjacent pair of the connecting parts.

According to the resin molded product and the molding method of the resin molded product of the present disclosure, when the second resin molding material is injected after the fixing protrusion is embedded into the fixing recess, the fixing protrusion does not move in the direction towards the gap between the inner wall part and the outer wall part. In this way, a relative positional relationship between the inner wall part and the outer wall part would not be changed even if the inner wall part or the outer wall part provided with the fixing protrusion is subjected to thermal shock or cooling shrinkage.

DESCRIPTION OF THE PREFERRED EMBODIMENTS

In the following, the present disclosure will be described in more detail in conjunction with the attached drawings, embodiments and specific examples. The following description is only an example for the convenience of the understanding of the present disclosure, and is not used to limit the scope of the present disclosure. In specific embodiments, components of a device can be changed, deleted or added according to actual situations, and the steps of the method can be changed, deleted, added or changed in order according to the actual situations.

Figure 1:
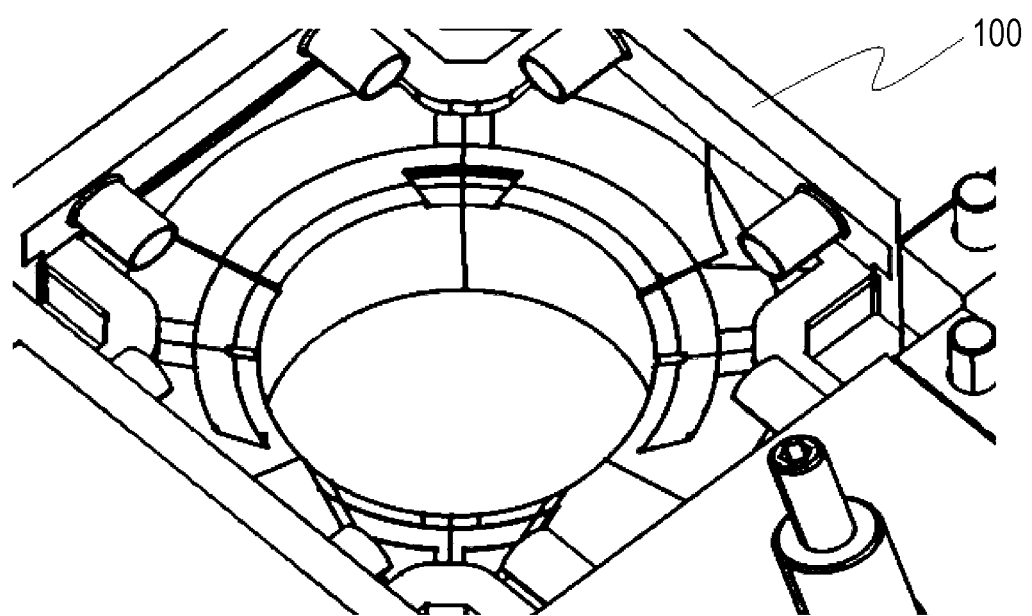
FIG. 1 is a schematic view of molding a first resin product using a first molding die in a molding method of a resin molded product of the present disclosure.
Figure 2:
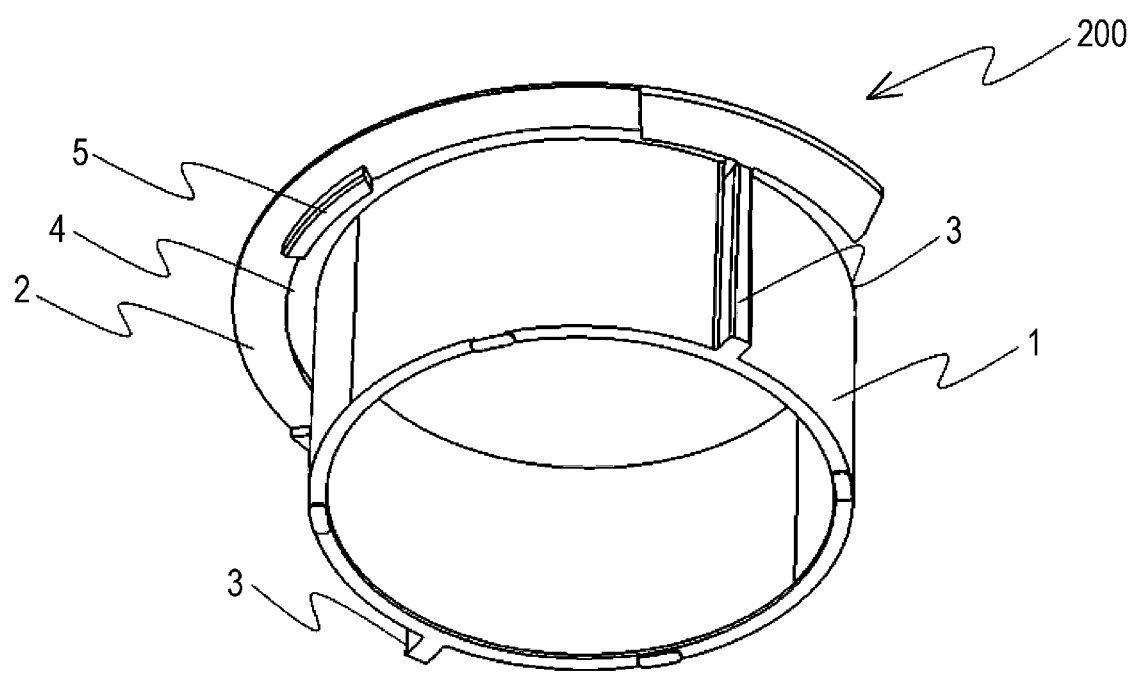
FIG. 2 is a schematic view of the first resin product in the molding method of the resin molded product of the present disclosure.
Figure 3:
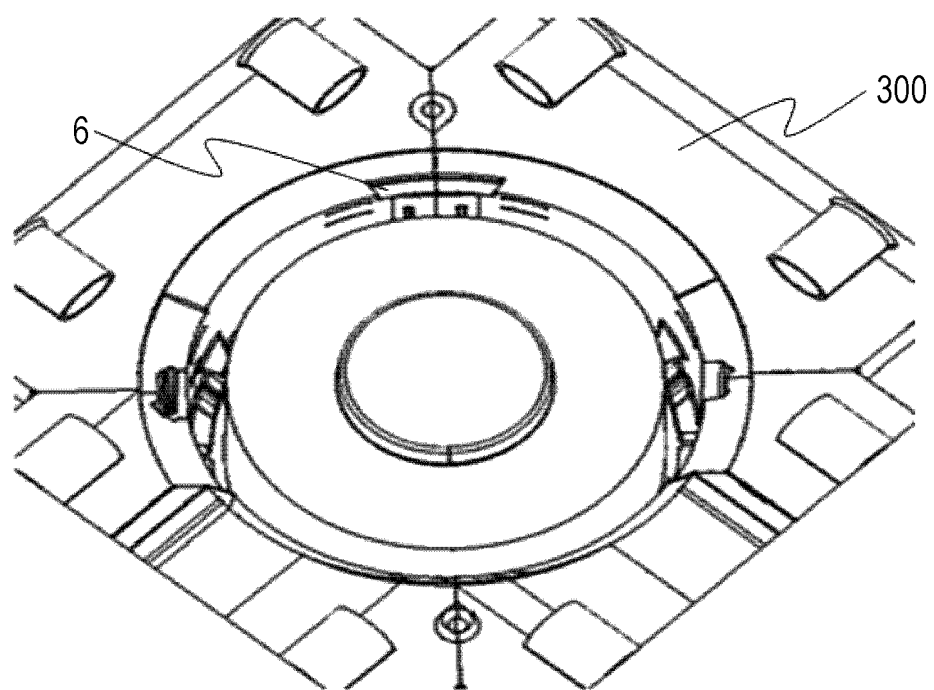
FIG. 3 is a schematic view of molding a second resin product using a second molding die in the molding method of the resin molded product of the present disclosure.
Figure 4:
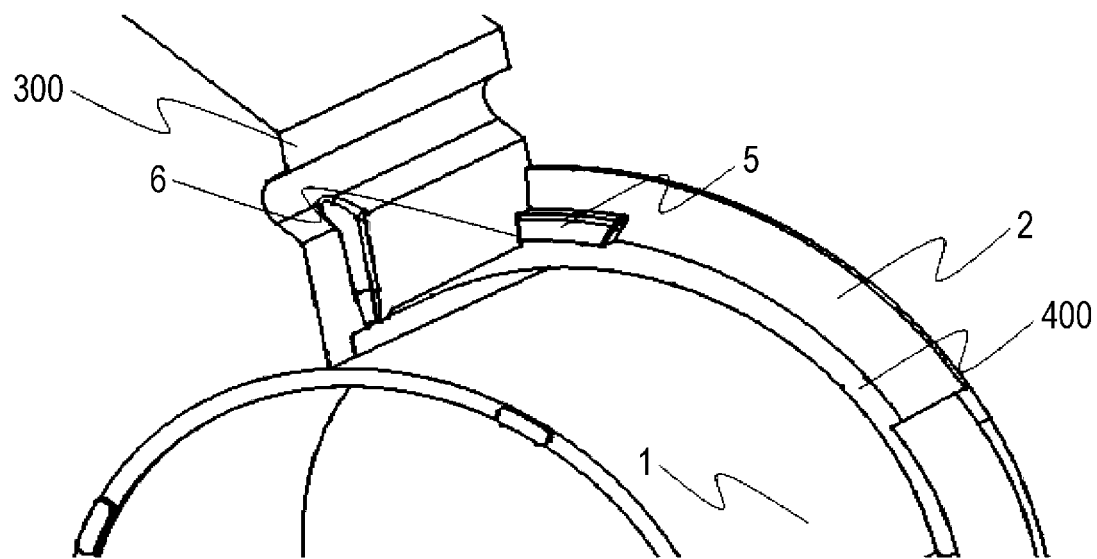
FIG. 4 is a partial schematic view of molding the second resin product using the second molding die in the molding method of the resin molded product of the present disclosure.
Figure 5:
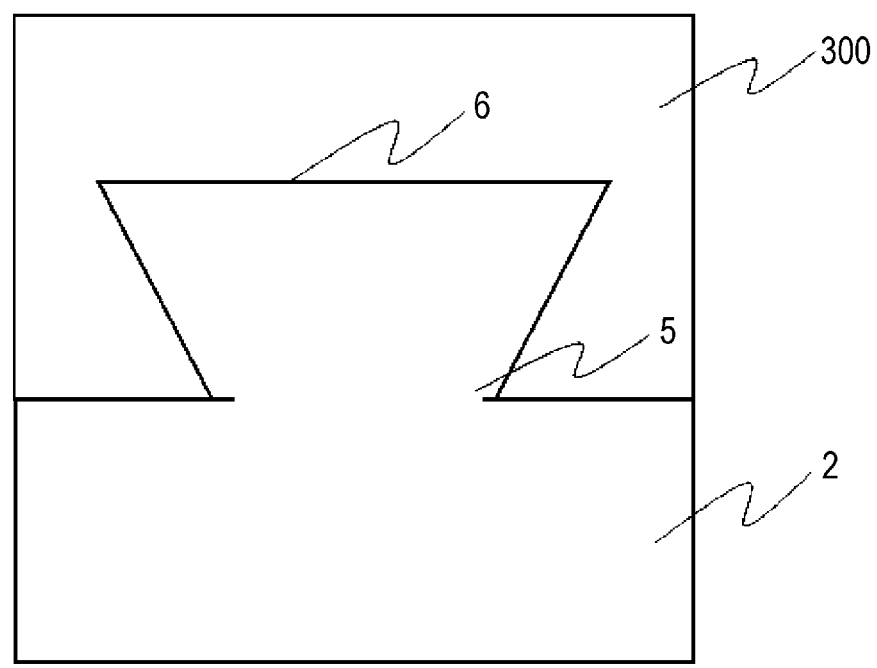
FIG. 5 is a schematic view of an embedded state of a fixing protrusion and a fixing recess in the molding method of the resin molded product of the present disclosure.
Figure 6A:
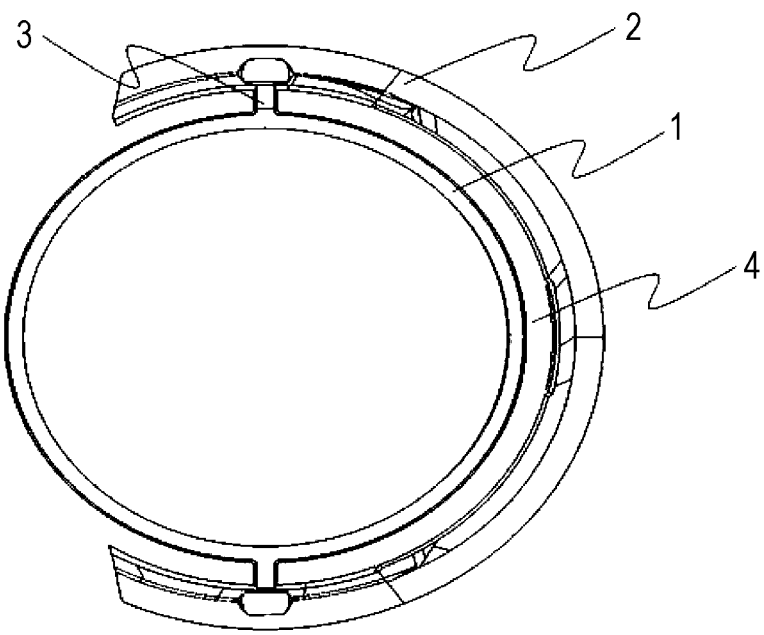
FIG. 6A to FIG. 6B are schematic views of a molding method of a resin molded product in the related art.
Figure 6B:
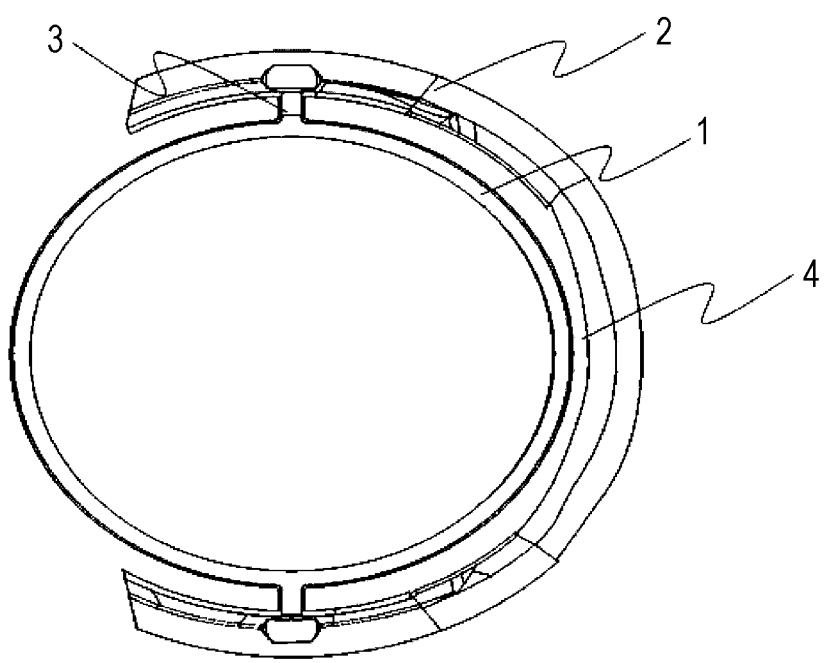

First, with reference to FIGS. 1 to 5, the molding of a first resin product and a second resin product in a molding method of a resin molded product of the present disclosure is described in detail. FIG. 1 is a schematic view of molding the first resin product using a first molding die in a first molding step of the molding method of the resin molded product of the present disclosure; FIG. 2 is a schematic view of the first resin product in the molding method of the resin molded product of the present disclosure; FIG. 3 is a schematic view of molding the second resin product using a second molding die in a second molding step of the molding method of the resin molded product of the present disclosure; FIG. 4 is a partial schematic view of molding the second resin product using the second molding die in the molding method of the resin molded product of the present disclosure; and, FIG. 5 is a schematic view of an embedded state of a fixing protrusion and a fixing recess in the molding method of the resin molded product of the present disclosure. As shown in FIG. 1 and FIG. 2, the first resin product 200 of this embodiment is formed by injecting a first resin molding material into the first molding die 100, and includes: an inner wall part 1, an outer wall part 2, a connecting part 3, a gap 4, and a fixing protrusion 5.

The resin molded product of this embodiment is described with reference to a resin cylindrical structure for supporting a knob button, as an example. As shown in FIG. 2, the inner wall part 1 is a hollow cylindrical structure, both an inner side and an outer side of the inner wall part 1 are smooth curved surfaces, and the knob button can be inserted into the inner side of the inner wall part 1 to support the knob button.

Furthermore, the outer wall part 2 is disposed at a periphery of the inner wall part 1, is spaced a certain distance from the outer side of the inner wall part 1 by the gap 4, and is in a thin-plate annular structure. In this embodiment, a size or width of the gap 4 is the same and equal, and the outer wall part 2 is semi-annular and formed around an outer side surface of the inner wall part 1. However, within the scope of the present disclosure, the size or width of the gap 4 between the inner wall part 1 and the outer wall part 2 may not be the same and equal, and may be set according to design requirements; furthermore, the outer wall part 2 may have other shapes outside the inner wall part 1, according to design requirements.

Furthermore, the connecting part 3 is disposed in the gap 4 and partially connects the inner wall part 1 and the outer wall part 2. In this embodiment, as shown in FIG. 2, two connecting parts 3 are disposed on the outer side surface of the inner wall part 1, at positions opposite to each other, and each protrude from the outer side surface of the inner wall part 1 towards the outer wall part 2, and extend to the inner side of the outer wall part 2.

Here, the number and positions of the connecting parts 3 are set according to the shape of the outer wall part 2 and a molding shape of a second resin product 400. For example, according to a length or weight of the outer wall part 2, more than two connecting parts 3 can be disposed at equal positions about the outer wall part 2 in a manner that subjects the outer wall part 2 to receive equal supporting force.

Furthermore, the fixing protrusion 5 is disposed on a back or lower surface of the thin-plate annular structure of the outer wall part 2, so that an appearance surface of the knob is not affected. The fixing protrusion 5 is formed by projecting downward and extending from a back or lower surface of a plate of the outer wall part 2, and a width of the fixing protrusion 5 increases in a direction extending away from the gap 4. In this embodiment, as shown in FIG. 2, the fixing protrusion 5 is disposed at a middle position of two connecting parts 3 facing each other. In this way, supporting forces received by the fixing protrusion 5 from the connecting parts 3 at both ends are the same, so that a situation where the outer wall part 2 is bent and deformed due to imbalance is avoided. Meanwhile, when the fixing protrusion 5 is embedded into a fixing recess 6 during the second molding step, the outer wall part 2 can also receive roughly equal support and position limitation from the connecting parts 3 and the fixing protrusion 5, so that the outer wall part 2 is prevented from being deformed.

Moreover, the width of the fixing protrusion 5, in the direction of a plate surface of the thin plate of the outer wall part 2, gradually increases in a direction extending away from the gap 4, generally forming a shape of an isosceles trapezoid, which can also ensure the gravity balance of the outer wall part 2, prevent a situation that imbalance is caused by uneven gravity due to the uneven shape of the fixing protrusion 5, and prevent the flatness problem when the second resin product 400 is molded In a preferred embodiment, it is better not to dispose the fixing protrusion 5 at a position opposite to the connecting part 2, because a fixing protrusion 5 which is not be well supported by the connecting part 3 may bend and deform the outer wall part 2 at the position of the fixing protrusion 5. At the same time, a distance between the fixing protrusion 5 and the connecting part 3 is maximized. In this situation, when the second molding step is performed, the outer wall part 2 between the connecting part 3 and the fixing protrusion 5 (especially the outer wall part 2 of a central portion between the connecting part 3 and the fixing protrusion 5) cannot receive good support and position limitation, and as such, is prone to deformation during the second molding step.

In addition, in the present disclosure, the fixing protrusion 5 may not be in the shape of the isosceles trapezoid, and the number and positions of the fixing protrusions 5 may be set according to the size and weight and the like of the outer wall part 2.

The first molding step and the second molding step of the molding method of the resin molded product of the present disclosure will now be described below in detail in conjunction with the attached drawings.

FIG. 1 shows the first molding die 100 for molding the first resin product 200. A step of molding the first resin product 200 by injecting the first resin molding material into the first molding die 100 is referred to herein as the first molding step. The first molding die 100 is provided with die grooves or structures at corresponding positions of the inner wall part 1, the outer wall part 2, the connecting part 3, the gap 4, and the fixing protrusion 5. Then, a hot first resin molding material is injected into the first molding die 100, and cooling and demolding are performed to obtain the first resin product 200.

Here, the first resin molding material can be a synthetic resin material with thermal plasticity or a thermal hardening property, and the first resin molding material may be non-transparent according to the requirements of this embodiment, for example, phenol resin, epoxy resin, and/or polyamide resin.

Next, in the second molding step, a second resin molding material is injected into a second molding die 300, shown in FIG. 3, to mold the second resin product 400. As shown in FIG. 3, the second molding die 300 is provided with the fixing recess 6. The fixing recess 6 can be fitted with the fixing protrusion 5 and limit movement of the fixing protrusion 5 in the direction towards the gap 4.

Here, the shape of the fixing recess 6 can correspond to the shape of the fixing protrusion 5. In this embodiment, the fixing protrusion 5 is in the general shape of an isosceles trapezoid, and the fixing recess 6 can correspond to the fixing protrusion 5, and can be formed as an isosceles trapezoid-shaped groove into which the fixing protrusion 5 can be embedded. In this way, the fixing protrusion 5 is completely clamped in the fixing recess 6, and cannot move in the direction of the inner and outer sides of the outer wall part 2. In addition, in the present disclosure, the fixing recess 6 may also be in a shape not completely corresponding to the shape of the fixing protrusion 5, as long as the fixing recess 6 can limit movement of the fixing protrusion 5 in a direction towards the gap 4 when the fixing protrusion 5 is embedded.

Furthermore, the second molding die 300 is provided with a supporting part on which the first resin product 200 can be placed. By placing the first resin product 200 on the second molding die 300, the inner wall part 1, the outer wall part 2, and the connecting part 3 can be supported, and the fixing protrusion 5 is embedded into the fixing recess 6 to limit movement of the fixing protrusion 5 in a direction towards the gap 4, and consequently, to limit movement of the outer wall part 2 in a direction towards the gap 4. Meanwhile, a die groove or structure for molding the second resin product 400 is formed at a corresponding position of the second resin product 400, between the positions where the inner wall part 1 and the outer wall part 2 are placed.

Furthermore, the second resin molding material is injected into the die groove at the corresponding position of the second resin product 400 to mold the second resin product 400. Here, the injected second resin molding material, like the first resin molding material, may be a synthetic resin material with thermal plasticity or a thermal hardening property. Additionally, according to the design requirements of this embodiment, the second resin product 400 may have a light guiding property so that the second resin product needs to be a transparent or translucent material, for example, polyester resin, polyphenol resin, and/or other materials.

Furthermore, as shown in FIGS. 4 and 5, the fixing protrusion 5 protrudes downward from the back or lower surface of the outer wall part 2 to form an isosceles trapezoid shape, and the width of the fixing protrusion 5 gradually increases in a direction extending away from the gap 4. The fixing recess 6 has a shape which can fully embed or surround the fixing protrusion 5. As shown in FIG. 5, when the first resin product 200 is placed into the second molding die 300 (e.g., from a direction perpendicular to a paper surface toward a direction of a back of the surface of paper), the fixing protrusion 5 is also inserted into the fixing recess 6 to establish an embedded state, such that the fixing protrusion 5 cannot move in a vertical direction and/or a left-right direction in the figure; that is, the outer wall part 2 provided with the fixing protrusion 5 can neither move in a direction towards the gap 4, nor in a direction along the gap 4. Therefore, when the second resin molding material is injected into the gap 4 and the second resin product 400 is cooled, the fixing protrusion 5 is firmly embedded into the fixing recess 6 in the inner side and outer side directions of the inner wall part 1 or the outer wall part 2. Hence, the outer wall part 2 provided with the fixing protrusion 5 cannot move under the support and position limitation of the connecting part 3 and the fixing protrusion 5, and the resin molded product is not deformed.

In this way, the outer wall part 2 is not bent in a direction towards the inner wall part 1 or deformed, the size of the gap 4 between the inner wall part 1 and the outer wall part 2 is still in an equal state, and as shown in FIG. 4, after the second resin product 400 is molded, the problem of an unequal width is avoided. Therefore, when the second resin product is illuminated, uneven illumination is avoided, a good appearance is ensured, and the quality of the resin molded product is not negatively affected.

Furthermore, in the present disclosure, the fixing protrusion 5 is not limited to being disposed on the outer wall part 2. Generally, positioning of the fixing protrusion 5 on the inner wall part 1 or the outer wall part 2 is selected according to the one with lower strength, especially the one having a thin-plate shape.

Specific embodiments and specific examples of the present disclosure have been described above with reference to the attached drawings. The specific embodiments and specific examples described above are only specific examples of the present disclosure, which are used to understand the present disclosure, rather than limit the scope of the present disclosure. Those skilled in the art can make various modifications, combinations and reasonable omissions of elements in specific embodiments and specific examples based on the technical ideas of the present disclosure, and the embodiments thus obtained are also included in the scope of the present disclosure. For example, the above-mentioned embodiments and specific examples may be combined with each other, and the combined embodiments are also included in the scope of the present disclosure. Therefore, it is intended that this disclosure not be limited to the particular embodiments disclosed, but that the invention will include all embodiments falling within the scope of the appended claims.

What is claimed is:

1. A method of molding a resin molded product, comprising:
    a first molding step of injecting a first resin molding material into a first molding die to form a first resin product, the first resin product having:
        an inner wall part,
        an outer wall part spaced from the inner wall part by a gap, and
        a connecting part disposed in the gap and partially connecting the inner wall part and the outer wall part; and,
    a second molding step of positioning the first resin product in a second molding die, and injecting a second resin molding material at least into the gap of the first resin product to form a second resin product,
    wherein in the first molding step, a fixing protrusion is formed on at least one of the inner wall part and the outer wall part of the first resin product, the fixing protrusion having a shape in which a width increases in a direction extending from the gap, and
    wherein in the second molding step, the fixing protrusion is embedded into a fixing recess disposed on the second molding die, thereby limiting movement of the fixing protrusion in a direction towards the gap.

2. The method of molding the resin molded product according to claim 1, wherein the fixing protrusion is not disposed at a position opposite to the connecting part.

3. The method of molding the resin molded product according to claim 2, wherein when the connecting part includes a plurality of connecting parts, and the plurality of connecting parts are disposed in a mutually spaced manner in a direction along the gap, the fixing protrusion is disposed at a middle position of an adjacent pair of the connecting parts.

4. The method of molding the resin molded product according to claim 1, wherein when one of the inner wall part and the outer wall part is a plate-shaped structure, the fixing protrusion is disposed on the inner wall part or the outer wall part of the plate-shaped structure.

5. The method of molding the resin molded product according to claim 1, wherein a width of the fixing protrusion increases in a direction extending away from the gap.

6. The method of molding the resin molded product according to claim 1, wherein in a state where the fixing protrusion is embedded into the fixing recess, movement of the fixing protrusion in a direction along the gap is limited.

* * * * *